United States Patent
Zhang et al.

(10) Patent No.: US 11,708,004 B2
(45) Date of Patent: Jul. 25, 2023

(54) CLAMPING VEHICLE LANE CONTROL METHOD AND SYSTEM, ELECTRONIC DEVICE AND STORAGE MEDIUM

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Shanghai (CN); Chunhua Huang, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/794,665

(22) PCT Filed: Jan. 25, 2021

(86) PCT No.: PCT/CN2021/073625
§ 371 (c)(1),
(2) Date: Jul. 22, 2022

(87) PCT Pub. No.: WO2021/148029
PCT Pub. Date: Jul. 29, 2021

(65) Prior Publication Data
US 2023/0122560 A1    Apr. 20, 2023

(30) Foreign Application Priority Data
Jan. 23, 2020    (CN) .......................... 202010076992.1

(51) Int. Cl.
*B60L 53/80*    (2019.01)
*B60K 1/04*    (2019.01)

(52) U.S. Cl.
CPC ................ *B60L 53/80* (2019.02); *B60K 1/04* (2013.01); *B60K 2001/0472* (2013.01)

(58) Field of Classification Search
CPC ....................................................... B60L 53/80
(Continued)

(56) References Cited

U.S. PATENT DOCUMENTS

| 5,612,606 A | * | 3/1997 | Guimarin | ............ | H01M 50/262 |
| | | | | | 414/281 |
| 2010/0071979 A1 | * | 3/2010 | Heichal | ............... | H01M 50/249 |
| | | | | | 180/68.5 |

(Continued)

FOREIGN PATENT DOCUMENTS

| CN | 108082139 A | 5/2018 |
| CN | 109204249 A | 1/2019 |

(Continued)

OTHER PUBLICATIONS

Apr. 15, 2021 International Search Report issued in International Patent Application No. PCT/CN2021/073625.

(Continued)

*Primary Examiner* — Jerry D Robbins

(57) ABSTRACT

A clamping vehicle lane control method and system, an electronic device and a storage medium. A clamping vehicle lane (1) has a vehicle carrying plane (11) that is used to carry an electric vehicle (9) and that can be raised and lowered. The clamping vehicle lane control method comprises: controlling the vehicle carrying plane (11) to be raised and lowered between any two heights among an initial height, a battery removal height, and a battery installation height. The height of the vehicle carrying plane (11) is controlled so that (Continued)

the vehicle carrying plane (11) may meet battery replacement requirements of each stage, thus shortening the overall battery replacement time, and improving the efficiency of battery replacement.

18 Claims, 5 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2011/0223459 A1* | 9/2011 | Heichal | B60L 50/66 403/33 |
| 2012/0110831 A1* | 5/2012 | Escande | B60K 1/04 29/592.1 |
| 2012/0233850 A1* | 9/2012 | Hozumi | B60L 50/66 29/729 |
| 2012/0255800 A1* | 10/2012 | Lejeune | F16B 21/02 248/220.21 |
| 2012/0326107 A1* | 12/2012 | Ojima | B60K 1/04 254/89 R |
| 2014/0369798 A1* | 12/2014 | Escande | B60L 53/80 414/584 |
| 2015/0307068 A1* | 10/2015 | Gaffoglio | B60L 50/60 414/809 |
| 2017/0151881 A1* | 6/2017 | Lee | B60L 53/80 |
| 2017/0151882 A1* | 6/2017 | Lee | B60L 50/66 |
| 2018/0154789 A1* | 6/2018 | Janku | B60K 1/04 |
| 2018/0251102 A1* | 9/2018 | Han | H01M 50/578 |
| 2020/0331358 A1* | 10/2020 | Lee | B60K 1/04 |
| 2020/0353838 A1* | 11/2020 | Zhang | B60L 53/35 |
| 2020/0385252 A1* | 12/2020 | Zhang | B62D 65/022 |
| 2020/0407206 A1* | 12/2020 | Bowers | B66F 3/46 |

FOREIGN PATENT DOCUMENTS

| | | |
|---|---|---|
| CN | 109501756 A | 3/2019 |
| CN | 208646812 U | 3/2019 |
| CN | 209065343 U | 7/2019 |
| CN | 209581427 U | 11/2019 |
| CN | 111231751 A | 6/2020 |
| CN | 111301215 A | 6/2020 |
| CN | 111301216 A | 6/2020 |
| FR | 2685547 A1 | 6/1993 |
| JP | H04210346 A | 7/1992 |
| JP | 2012006498 A | 1/2012 |
| JP | 2012192782 A | 10/2012 |

OTHER PUBLICATIONS

Apr. 15, 2021 Written Opinion of the International Searching Authority issued in International Patent Application No. PCT/CN2021/073625.

Jul. 26, 2022 International Preliminary Report on Patentability issued in International Patent Application No. PCT/CN2021/073625.

Jan. 6, 2022 First Office Action issued in Chinese Patent Application No. 202010076992.1.

Mar. 15, 2022 Second Office Action issued in Chinese Patent Application No. 202010076992.1.

Feb. 21, 2023 First Office Action issued in Japanese Patent Application No. 2022-544822.

\* cited by examiner

CLAMPING VEHICLE LANE CONTROL METHOD AND SYSTEM, ELECTRONIC DEVICE AND STORAGE MEDIUM

The present application is a National Stage of International Application No. PCT/CN2021/073625, filed on Jan. 25, 2021, which claims priority of the Chinese Patent Application No. CN2020100769921, filed on Jan. 23, 2020, the contents of which are incorporated herein by reference in their entireties.

TECHNICAL FIELD

The present disclosure belongs to the field of battery swapping control, and particularly relates to a clamping vehicle lane control method and system, an electronic device and a storage medium.

BACKGROUND

The existing electric vehicles mainly have two charging modes, one is a direct charging mode, and the other is a quick-change charging mode. Among them, for the direct charging mode, a charging post is required to be set to charge an electric vehicle, but this mode takes a longer charging time and has a lower efficiency; for the quick-change charging mode, a battery swapping station is required to be set, and quick battery swapping can be implemented by swapping a battery pack of an electric vehicle, and the charging time is greatly decreased compared with the direct charging mode, but as the battery swapping process in the mode comprises disassembling a battery pack and assembling another battery pack, the problem that the battery swapping efficiency is lower due to a longer battery pack swapping time still exists.

Content of the Present Invention

The present disclosure is intended to overcome the defects that in the prior art, the time consumption is long and the efficiency is low in the battery swapping process of disassembling a battery pack and assembling another battery pack in the quick-change charging mode, and provides a clamping vehicle lane control method and system, an electronic device and a storage medium.

The present disclosure solves the technical problem described above through the following technical scheme.

Provided is a clamping vehicle lane control method, the clamping vehicle lane having a vehicle carrying plane used for carrying an electric vehicle and capable of raising and lowering;

the clamping vehicle lane control method comprises:

controlling the vehicle carrying plane to be raised and lowered between any two heights among an initial height, a battery removal height and a battery installation height, the battery removal height being a height that matches a battery pack removal process of the electric vehicle, and the battery installation height being a height that matches a battery pack installation process of the electric vehicle.

Preferably, a battery swapping device walking plane for walking of a battery swapping device used for disassembling and assembling a battery pack is arranged on the clamping vehicle lane;

the battery removal height is set to be: higher than the initial height, and when the vehicle carrying plane is positioned at the battery removal height, a relative height between the vehicle carrying plane and the battery swapping device walking plane is higher than a height of the battery swapping device without loading a battery pack.

Preferably, a battery swapping device walking plane for walking of a battery swapping device used for disassembling and assembling a battery pack is arranged on the clamping vehicle lane;

the battery installation height is set to be: higher than the initial height, and when the vehicle carrying plane is positioned at the battery installation height, a relative height between the vehicle carrying plane and the battery swapping device walking plane is higher than a height of the battery swapping device with a loaded battery pack.

Preferably, the battery removal height is less than or equal to the battery installation height.

Preferably, controlling the vehicle carrying plane to be raised and lowered between any two heights among an initial height, a battery removal height and a battery installation height comprises the following step:

controlling the vehicle carrying plane to be kept at the initial height before the electric vehicle is parked at the vehicle carrying plane.

Preferably, controlling the vehicle carrying plane to be raised and lowered between any two heights among an initial height, a battery removal height and a battery installation height comprises the following step:

controlling the vehicle carrying plane to reach the battery removal height after the electric vehicle is parked at the vehicle carrying plane.

Preferably, controlling the vehicle carrying plane to be raised and lowered between any two heights among an initial height, a battery removal height and a battery installation height comprises the following step:

controlling the vehicle carrying plane to reach the battery installation height after the battery pack is disassembled from the electric vehicle.

Preferably, controlling the vehicle carrying plane to be raised and lowered between any two heights among an initial height, a battery removal height and a battery installation height comprises the following step:

controlling the vehicle carrying plane to return back to the initial height after the battery pack is assembled on the electric vehicle.

Preferably, the clamping vehicle lane control method further comprises:

controlling the vehicle carrying plane to be raised and lowered between a first operation height and any one of the initial height, the battery removal height and the battery installation height, the first operation height being another height that matches the battery pack removal process of the electric vehicle and different from the battery removal height.

Preferably, a battery swapping device walking plane for walking of a battery swapping device used for disassembling and assembling a battery pack is arranged on the clamping vehicle lane;

the first operation height is set to be: lower than the battery removal height, and when the vehicle carrying plane is positioned at the first operation height, the relative height between the vehicle carrying plane and the battery swapping device walking plane meets a height condition of the battery swapping device for disassembling the battery pack.

Preferably, the clamping vehicle lane control method further comprises:

controlling the vehicle carrying plane to be raised and lowered between a second operation height and any one of the initial height, the battery removal height and the battery installation height, the second operation height being another height that matches the battery pack installation process of the electric vehicle and different from the battery installation height.

Preferably, a battery swapping device walking plane for walking of a battery swapping device used for disassembling and assembling a battery pack is arranged on the clamping vehicle lane;

the second operation height is set to be: lower than the battery installation height, and when the vehicle carrying plane is positioned at the second operation height, the relative height between the vehicle carrying plane and the battery swapping device walking plane meets a height condition of the battery swapping device for assembling the battery pack.

Preferably, controlling the vehicle carrying plane to be raised and lowered between a first operation height and any one of the initial height, the battery removal height and the battery installation height comprises the following step:

controlling the vehicle carrying plane to reach the first operation height in the battery pack removal process.

Preferably, controlling the vehicle carrying plane to be raised and lowered between a second operation height and any one of the initial height, the battery removal height and the battery installation height comprises the following step:

controlling the vehicle carrying plane to reach the second operation height in the battery pack installation process.

Preferably, height sensors are arranged on the vehicle carrying plane and/or a plane where the clamping vehicle lane is positioned, respectively, the height sensors being used for detecting a relative height between the vehicle carrying plane and a reference plane; the clamping vehicle lane control method further comprises the following steps:

detecting whether the vehicle carrying plane reaches the initial height, the battery removal height, the battery installation height, the first operation height or the second operation height through the height sensors, and controlling a lifting mechanism used for controlling a height of the vehicle carrying plane according to a detection result.

Preferably, a battery swapping device walking plane for walking of a battery swapping device used for disassembling and assembling a battery pack is arranged on the clamping vehicle lane, and the vehicle carrying plane, when positioned at the initial height, is positioned on the same plane as the battery swapping device walking plane.

Provided is a clamping vehicle lane control system, the clamping vehicle lane having a vehicle carrying plane used for carrying an electric vehicle and capable of raising and lowering;

the clamping vehicle lane control system comprises:

a height control module, used for controlling the vehicle carrying plane to be raised and lowered between any two heights among an initial height, a battery removal height and a battery installation height, the battery removal height being a height that matches a battery pack removal process of the electric vehicle, and the battery installation height being a height that matches a battery pack installation process of the electric vehicle.

Preferably, a battery swapping device walking plane for walking of a battery swapping device used for disassembling and assembling a battery pack is arranged on the clamping vehicle lane;

the battery removal height is set to be: higher than the initial height, and when the vehicle carrying plane is positioned at the battery removal height, a relative height between the vehicle carrying plane and the battery swapping device walking plane is higher than a height of the battery swapping device without loading a battery pack.

Preferably, a battery swapping device walking plane for walking of a battery swapping device used for disassembling and assembling a battery pack is arranged on the clamping vehicle lane;

the battery installation height is set to be: higher than the initial height, and when the vehicle carrying plane is positioned at the battery installation height, a relative height between the vehicle carrying plane and the battery swapping device walking plane is higher than a height of the battery swapping device with a loaded battery pack.

Preferably, the battery removal height is less than or equal to the battery installation height.

Preferably, the height control module is specifically used for controlling the vehicle carrying plane to be kept at the initial height before the electric vehicle is parked at the vehicle carrying plane.

Preferably, the height control module is specifically used for controlling the vehicle carrying plane to reach the battery removal height after the electric vehicle is parked at the vehicle carrying plane.

Preferably, the height control module is specifically used for controlling the vehicle carrying plane to reach the battery installation height after the battery pack is disassembled from the electric vehicle.

Preferably, the height control module is specifically used for controlling the vehicle carrying plane to return back to the initial height after the battery pack is assembled on the electric vehicle.

Preferably, the height control module is further used for controlling the vehicle carrying plane to be raised and lowered between a first operation height and any one of the initial height, the battery removal height and the battery installation height, the first operation height being another height that matches the battery pack removal process of the electric vehicle and different from the battery removal height.

Preferably, a battery swapping device walking plane for walking of a battery swapping device used for disassembling and assembling a battery pack is arranged on the clamping vehicle lane;

the first operation height is set to be: lower than the battery removal height, and when the vehicle carrying plane is positioned at the first operation height, the relative height between the vehicle carrying plane and the battery swapping device walking plane meets a height condition of the battery swapping device for disassembling the battery pack.

Preferably, the height control module is further used for controlling the vehicle carrying plane to be raised and lowered between a second operation height and any one of the initial height, the battery removal height and the battery installation height, the second operation height being another height that matches the battery pack installation process of the electric vehicle and different from the battery installation height.

Preferably, a battery swapping device walking plane for walking of a battery swapping device used for disassembling and assembling a battery pack is arranged on the clamping vehicle lane;

the second operation height is set to be: lower than the battery installation height, and when the vehicle carrying plane is positioned at the second operation height, the relative height between the vehicle carrying plane and the battery swapping device walking plane meets a height condition of the battery swapping device for assembling the battery pack.

Preferably, the height control module is specifically used for controlling the vehicle carrying plane to reach the first operation height in the battery pack removal process.

Preferably, the height control module is specifically used for controlling the vehicle carrying plane to reach the second operation height in the battery pack installation process.

Preferably, height sensors are arranged on the vehicle carrying plane and/or a plane where the clamping vehicle lane is positioned, respectively, the height sensors being used for detecting a relative height between the vehicle carrying plane and a reference plane; the clamping vehicle lane control system further comprises:

a height detection module, used for detecting whether the vehicle carrying plane reaches the initial height, the battery removal height, the battery installation height, the first operation height or the second operation height through the height sensors, and controlling a lifting mechanism used for controlling a height of the vehicle carrying plane according to a detection result.

Preferably, a battery swapping device walking plane for walking of a battery swapping device used for disassembling and assembling a battery pack is arranged on the clamping vehicle lane, and the vehicle carrying plane, when positioned at the initial height, is positioned on the same plane as the battery swapping device walking plane.

Provided is an electronic device, which comprises a memory, a processor and a computer program stored on the memory and executable on the processor, the processor, when executing the program, implementing the method described above.

Provided is a computer-readable storage medium having a computer program stored thereon, the program, when executed by a processor, implementing the steps of the method described above.

On the basis of the general knowledge in the art, the above preferred conditions can be combined arbitrarily to obtain preferred embodiments of the present disclosure.

The positive and progressive effects of the present disclosure are as follows: the vehicle carrying plane is subjected to height control, so that the vehicle carrying plane can meet the battery swapping requirements of each stage, thereby shortening the overall battery swapping time, and improving the battery swapping efficiency.

DETAILED DESCRIPTION OF THE PREFERRED EMBODIMENT

Figure 1:
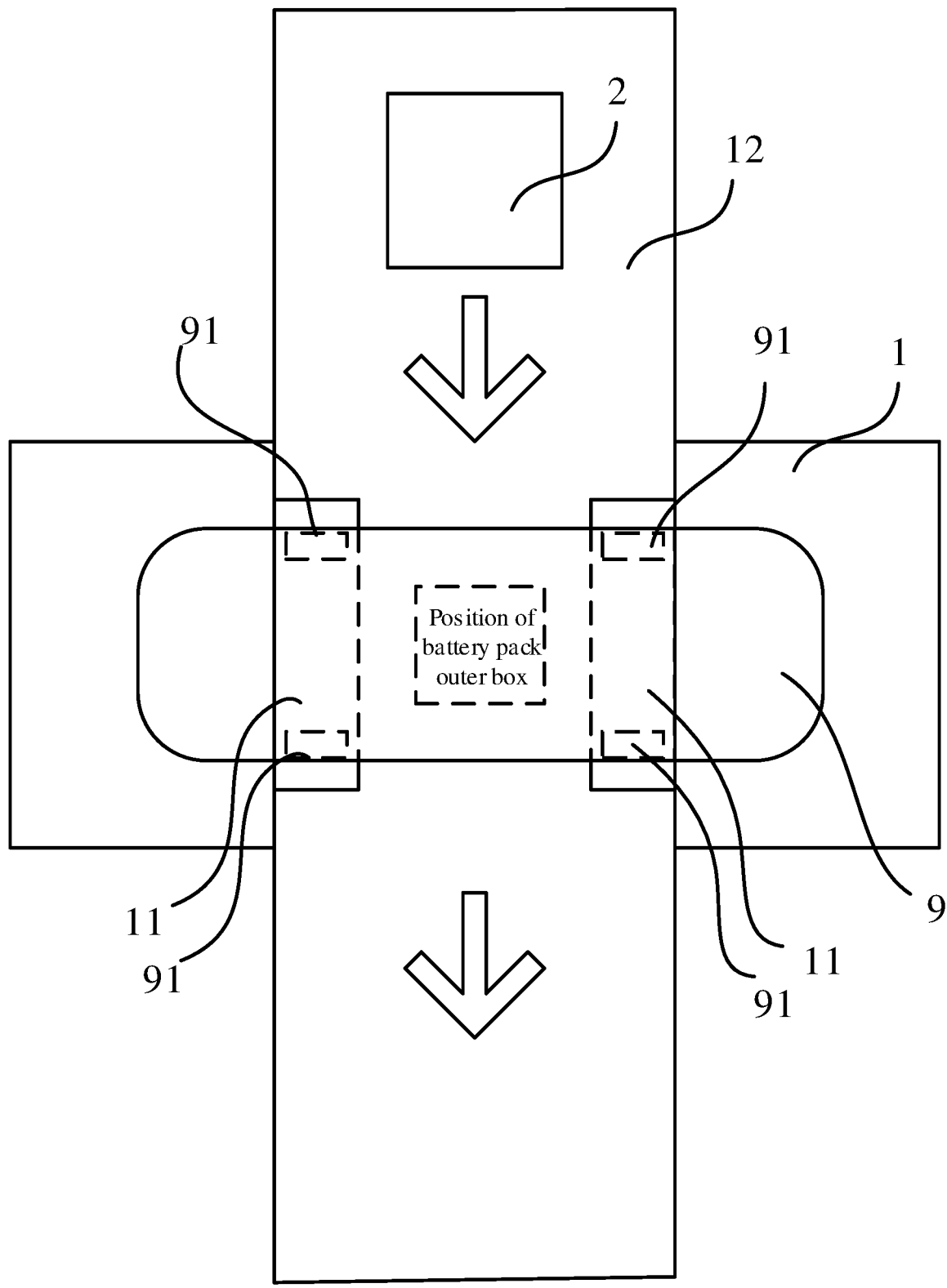
FIG. 1 is a schematic top diagram of a battery swapping process of a vehicle.

The present disclosure is further illustrated by the following examples, which are not intended to limit the present disclosure.

Before detailed description of embodiments of the present disclosure, a brief description of the clamping vehicle lane shall be given first. As shown in FIGS. 1-6, a clamping vehicle lane 1 is a device used in disassembling a battery pack and assembling another battery pack and generally used in a battery swapping station, and its main function is to adjust the height of a vehicle in a bottom battery swapping manner (i.e., disassembling and assembling the battery pack from the bottom of the vehicle 9 by a battery swapping device for disassembling and assembling the battery pack), so as to provide sufficient vehicle bottom space for battery swapping.

The clamping vehicle lane 1 has a vehicle carrying plane 11, the vehicle carrying plane 11 being used for carrying an electric vehicle 9 and capable of raising and lowering in the height direction through a related lifting mechanism. However, as the mechanical structure of the lifting mechanism is not a key point of the present disclosure, so the detailed description is not provided herein. In the figure, the vehicle carrying plane 11 is not a continuous complete plane, but is a sectional type, namely two sections of vehicle carrying plane 11 capable of carrying vehicle wheels 91 are arranged on two sides, and the middle portion of the plane is hollow. In the following embodiments, the two sections of vehicle carrying planes 11 are synchronously controlled, that is, simultaneously controlled to be raised and lowered and have the same height all the time.

A battery swapping device walking plane 12 for walking of a battery swapping device 2 is arranged on the clamping vehicle lane 1, the battery swapping device 2 being a bottom battery swapping device and being used for disassembling a battery pack and assembling another battery pack from the bottom of the vehicle. When the battery swapping device 2 reaches the bottom of the vehicle 9, the battery pack is disassembled and another battery pack is assembled in the hollow area in the middle of the vehicle carrying plane 11. Arrows in FIG. 1 are a feasible walking route for the battery swapping device 2, namely, the battery swapping device enters the vehicle bottom from one end of the battery swapping device walking plane 12 and then exits the vehicle bottom from the other end. Of course, the battery swapping device 2 can also adopt other walking routes, namely, the battery swapping device enters the vehicle bottom from one end of the battery swapping device walking plane 12 and then exits the vehicle bottom from the same end in a backward manner.

It should be noted that the above contents and the accompanying drawings only schematically show a clamping vehicle lane and a battery swapping device applicable to the following embodiments, but do not indicate that the following embodiments can only be used for the clamping vehicle lane and the battery swapping device with the above structure or pattern, and a clamping vehicle lane and a battery swapping device with the same or similar functions and battery swapping principles are also applicable to the following embodiments.

Embodiment 1

The embodiment provides a clamping vehicle lane control method, and as shown in FIGS. 1-6, the method is mainly used for controlling the height of a vehicle carrying plane 11 of a clamping vehicle lane 1, and comprises the following step:

controlling the vehicle carrying plane 11 to be raised and lowered between any two heights among an initial height h0, a battery removal height h1 and a battery installation height h2.

In the step, the initial height h0 is a height of the vehicle carrying plane 11 which is immobile, and the vehicle carrying plane 11, when positioned at the initial height h0, can be positioned on the same plane as the battery swapping device walking plane 12; the battery removal height h1 is a height that matches the battery pack removal process of the electric vehicle; the battery installation height h2 is a height that matches the battery pack installation process of the electric vehicle. Both the battery removal height h1 and the battery installation height h2 are different from the initial height h0.

In this embodiment, the whole battery pack removal process may substantially include an entry stage of the battery swapping device before disassembling a battery, a battery disassembling stage, and an exit stage of the battery swapping device after disassembling the battery. The whole battery pack installation process may roughly include an entry stage of the battery swapping device before assembling a battery, a battery assembling stage, and an exit stage of the battery swapping device after assembling the battery. The battery removal height h1 can be matched with the entry stage of the battery swapping device before disassembling a battery, and is set to be higher than the initial height h0, and when the vehicle carrying plane 11 is positioned at the battery removal height h1, the relative height between the vehicle carrying plane 11 and the battery swapping device walking plane 12 is higher than the height of the battery swapping device 2 without loading a battery pack. The battery installation height h2 can be matched with the entry stage of the battery swapping device before assembling a battery, and is set to be higher than the initial height h0, and when the vehicle carrying plane 11 is positioned at the battery installation height h2, the relative height between the vehicle carrying plane 11 and the battery swapping device walking plane 12 is higher than the height of the battery swapping device 2 with a loaded battery pack.

Theoretically, the battery removal height h1 may be greater than, less than, or equal to the battery installation height h2. However, considering that for the battery swapping device 2, the battery pack is usually loaded on the top of the battery swapping device 2 and the height of the battery swapping device 2 with the loaded battery pack is higher than the height of the battery swapping device 2 without loading the battery pack, and in order to avoid that the vehicle carrying plane 11 is lifted too high during the battery pack removal process, so that too much lifting time is consumed, and the overall battery swapping efficiency is affected, the battery removal height h1 is preferably less than or equal to the battery installation height h2 in this embodiment. The specific values of the battery removal height h1 and the battery installation height h2 can be calculated by comprehensively considering factors such as the vehicle chassis height, the relative height between the initial height h0 and the battery swapping device walking plane 12, the height of the battery swapping device 2, and the height of the battery swapping device 2 with a loaded battery.

Figure 2:
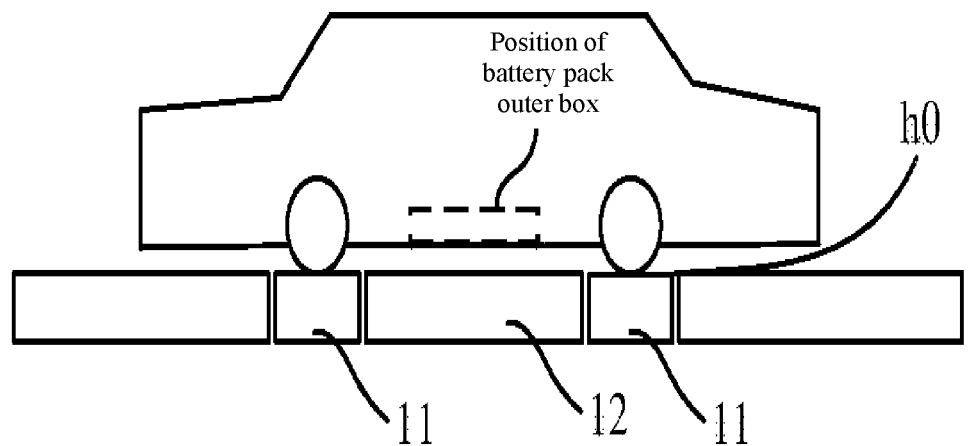
FIG. 2 is a side diagram of a vehicle carrying plane reaching an initial height according to Embodiment 1.
Figure 3:
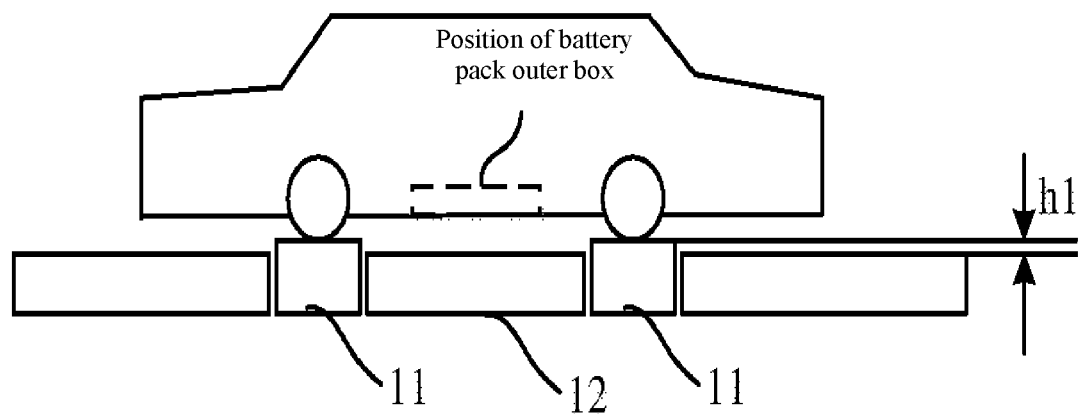
FIG. 3 is a side diagram of a vehicle carrying plane reaching a battery installation height according to Embodiment 1.
Figure 4:
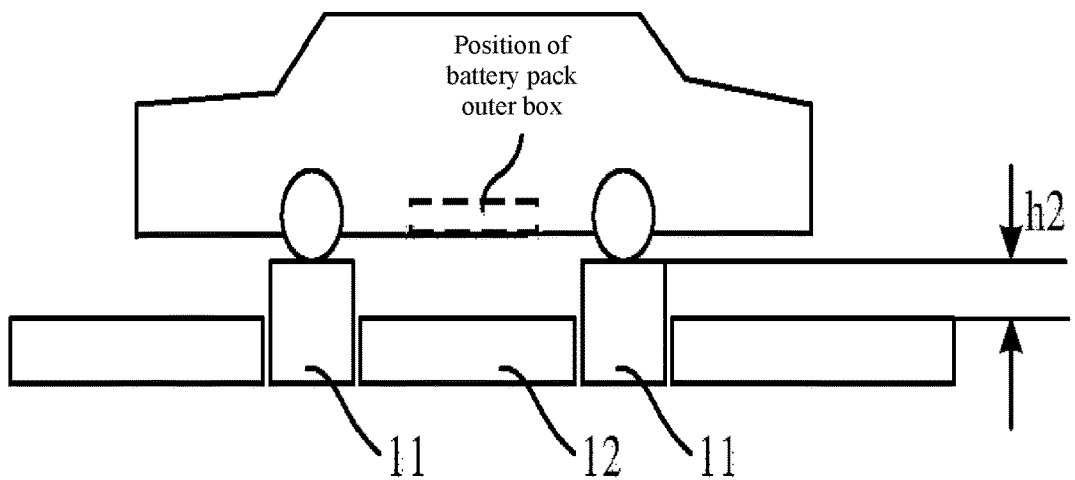
FIG. 4 is a side diagram of a vehicle carrying plane reaching a battery removal height according to Embodiment 1.

In this embodiment, controlling the vehicle carrying plane 11 to be raised and lowered between any two heights among an initial height h0, a battery removal height h1 and a battery installation height h2 may comprise controlling the vehicle carrying plane 11 to be raised and lowered from the initial height h0 to the battery removal height h1, from the initial height h0 to the battery installation height h2, from the battery removal height h1 to the battery installation height h2, from the battery removal height h1 to the initial height h0, from the battery installation height h2 to the initial height h0, or from the battery installation height h2 to the battery removal height h1. The way the vehicle carrying plane 11 is controlled to be raised and lowered as described above is specifically selected according to the actual need of disassembling and assembling the battery, for example:

before the electric vehicle is parked at the vehicle carrying plane 11, the vehicle carrying plane 11 is controlled to be kept at the initial height h0, referring to FIG. 2, wherein the vehicle carrying plane 11, when positioned at the initial height h0, can be positioned on the same plane as a plane where the clamping vehicle lane 1 is positioned, such that the vehicle is easy to enter the vehicle carrying plane 11;

after the electric vehicle is parked at the vehicle carrying plane 11, the vehicle carrying plane 11 is controlled to reach the battery removal height h1, referring to FIG. 3, wherein after the vehicle carrying plane 11 reaches the battery removal height h1, the battery swapping device 2 without loading the battery pack can move into the lower part of the bottom of the vehicle for disassembling the battery pack;

after the battery pack is disassembled from the electric vehicle, the vehicle carrying plane 11 is controlled to reach the battery installation height h2, referring to FIG. 4, wherein after the vehicle carrying plane 11 reaches the battery installation height h2, the battery swapping device 2 loaded with the disassembled battery pack can exit the lower part of the bottom of the vehicle, put the disassembled battery pack back to a battery rack or other positions, then load a new battery pack, and enter the lower part of the bottom of the vehicle again for assembling the battery pack;

after the battery pack is assembled on the electric vehicle, the vehicle carrying plane 11 is controlled to return back to the initial height h0, referring to FIG. 2, wherein the vehicle carrying plane 11, when positioned at the initial height h0, can be positioned on the same plane as a plane where the clamping vehicle lane 1 is positioned, such that the vehicle is easy to exit the vehicle carrying plane 11.

In this embodiment, the clamping vehicle lane control method may further comprise the following step:

Controlling the vehicle carrying plane 11 to be raised and lowered between the first operation height h3 and any one of the initial height h0, the battery removal height h1 and the battery installation height h2.

The first operation height h3 is another height that matches the battery pack removal process of the electric vehicle and different from the battery removal height h1.

The first operation height h3 can be matched with the battery disassembling stage described above, and set to be lower than the battery removal height h1, and may even be lower than the initial height h0, and when the vehicle carrying plane 11 is positioned at the first operation height h3, the relative height between the vehicle carrying plane 11 and the battery swapping device walking plane 12 meets the height condition of the battery swapping device 2 for disassembling the battery pack. The height condition of the battery swapping device 2 for disassembling the battery pack needs to be determined according to the operation process of the battery swapping device 2 in the battery disassembling stage, for example, when the battery pack is disassembled by the battery swapping device 2, a battery swapping platform on the battery swapping device needs to be lifted, such that a battery pack unlocking mechanism on the battery swapping platform unlocks the battery pack at the vehicle bottom, and then the disassembled battery pack is carried by the battery swapping platform. In order to match with the lifting height of the battery swapping platform and shorten the distance between the vehicle bottom and the battery swapping platform, the first operation height h3 can be properly adjusted to change the relative height between the battery swapping platform and the vehicle carrying plane 11, so as to ensure that the battery pack unlocking mechanism successfully unlocks and catches the disassembled battery pack.

Figure 5:
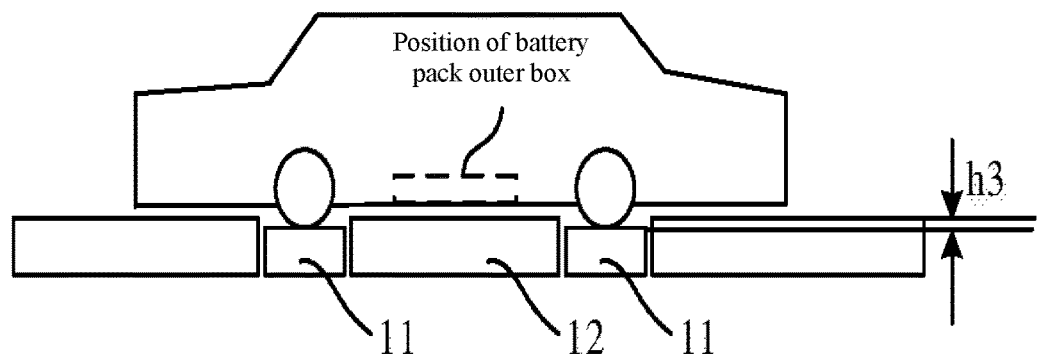
FIG. 5 is a side diagram of a vehicle carrying plane reaching a first operation height according to Embodiment 1.

In this embodiment, controlling the vehicle carrying plane 11 to be raised and lowered between the first operation height h3 and any one of the initial height h0, the battery removal height h1 and the battery installation height h2 may comprise controlling the vehicle carrying plane 11 to be raised and lowered from the initial height h0 to the first operation height h3, from the battery removal height h1 to the first operation height h3, from the battery installation height h2 to the first operation height h3, from the first operation height h3 to the initial height h0, from the first operation height h3 to the battery removal height h1, or from the first operation height h3 to the battery installation height h2. The way the vehicle carrying plane 11 is controlled to be raised and lowered as described above is specifically selected according to the actual need of disassembling the battery, for example:

in the battery pack removal process, the vehicle carrying plane 11 is controlled to reach the first operation height h3, referring to FIG. 5, wherein when the vehicle carrying plane 11 is positioned at the first operation height h3, the lifted battery swapping platform can enter the vehicle bottom, the battery pack at the vehicle bottom is unlocked, and then the disassembled battery pack is caught. In connection with the entry stage of the battery swapping device before disassembling a battery described above, this step is that the plane descends from the battery removal height h1 to the first operation height h3.

In this embodiment, the clamping vehicle lane control method may further comprise the following step:

controlling the vehicle carrying plane 11 to be raised and lowered between the second operation height h4 and any one of the initial height h0, the battery removal height h1 and the battery installation height h2.

The second operation height h4 is another height that matches the battery pack installation process of the electric vehicle and different from the battery installation height h2.

The second operation height h4 can be matched with the battery assembling stage described above, and set to be lower than the battery installation height h2, and may even be lower than the initial height h0, and when the vehicle carrying plane 11 is positioned at the second operation height h4, the relative height between the vehicle carrying plane 11 and the battery swapping device walking plane 12 meets the height condition of the battery swapping device 2 for assembling the battery pack. The second operation height h4 may be the same as or different from the first operation height.

The height condition of the battery swapping device 2 for assembling the battery pack needs to be determined according to the operation process of the battery swapping device 2 in the battery assembling stage, for example, when the battery pack is assembled by the battery swapping device 2, a battery swapping platform on the battery swapping device needs to be lifted, such that the battery pack on the battery swapping platform is placed in a battery pack outer box, and then the battery pack is locked in the battery pack outer box by using a battery pack locking mechanism on the battery pack outer box. In order to match with the lifting height of the battery swapping platform and shorten the distance between the vehicle bottom and the battery swapping platform, the second operation height h4 can be properly adjusted to change the relative height between the battery swapping platform and the vehicle carrying plane 11, so as to ensure that the battery pack is successfully placed in the battery pack outer box and the battery pack is locked by the battery pack locking mechanism.

Figure 6:
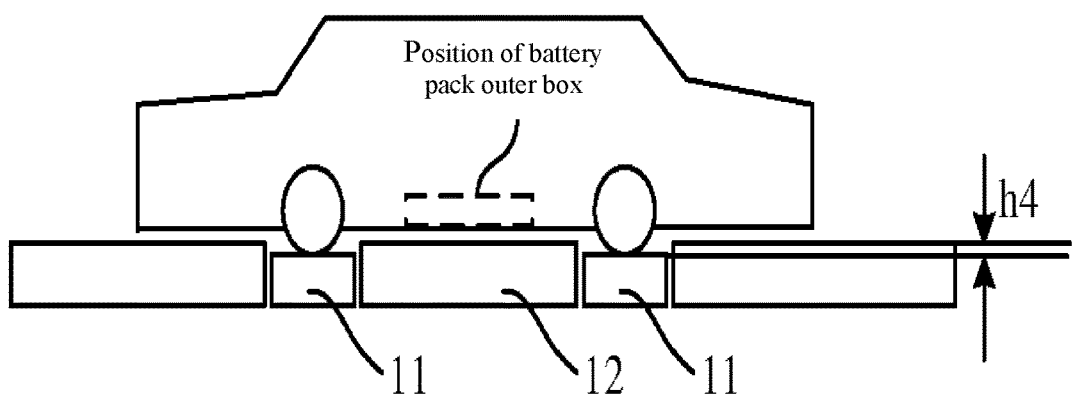
FIG. 6 is a side diagram of a vehicle carrying plane reaching a second operation height according to Embodiment 1.

In this embodiment, controlling the vehicle carrying plane 11 to be raised and lowered between the second operation height h4 and any one of the initial height h0, the battery removal height h1 and the battery installation height h2 may comprise controlling the vehicle carrying plane 11 to be raised and lowered from the initial height h0 to the second operation height h4, from the battery removal height h1 to the second operation height h4, from the battery installation height h2 to the second operation height h4, from the second operation height h4 to the initial height h0, from the second operation height h4 to the battery removal height h1, or from the second operation height h4 to the battery installation height h2. The way the vehicle carrying plane 11 is controlled to be raised and lowered as described above is specifically selected according to the actual need of assembling the battery, for example:

the vehicle carrying plane 11 is controlled to reach the second operation height h4 in the battery pack installation process, referring to FIG. 6. In connection with the entry stage of the battery swapping device before assembling a battery described above, this step is that the plane descends from the battery installation height h2 to the second operation height h4.

In this embodiment, in order to accurately control the vehicle carrying plane 11 to reach the heights described above, height sensors are arranged on the vehicle carrying plane 11 and/or a plane where the clamping vehicle lane 1 is positioned, respectively, the height sensors being used for detecting a relative height between the vehicle carrying plane 11 and a reference plane. The clamping vehicle lane control method may further comprise:

detecting whether the vehicle carrying plane 11 reaches the initial height h0, the battery removal height h1, the battery installation height h2, the first operation height h3 or the second operation height h4 through the height sensors, and controlling a lifting mechanism used for controlling the height of the vehicle carrying plane 11 according to a detection result. For example, before the electric vehicle is parked at the vehicle carrying plane 11, whether the vehicle carrying plane 11 reaches the initial height h0 is determined; after the electric vehicle is parked at the vehicle carrying plane 11, whether the vehicle carrying plane 11 reaches the battery removal height h1 is determined; after the battery pack is disassembled from the electric vehicle, whether the vehicle carrying plane 11 reaches the battery installation height h2 is determined; in the battery pack removal process, whether the vehicle carrying plane 11 reaches the first operation height h3 is determined; and in the battery pack installation process, whether the vehicle carrying plane 11 reaches the second operation height h4 is determined. If the actual lifting height of the vehicle carrying plane 11 is not high enough and does not reach a corresponding height, then the lifting mechanism is controlled to continue lifting until the corresponding height is reached.

The clamping vehicle lane control method of the embodiment controls the height of the vehicle carrying plane 11, such that the vehicle carrying plane 11 can meet the battery swapping requirements of each stage, thereby shortening the overall battery swapping time, and improving the battery swapping efficiency.

Embodiment 2

Figure 7:
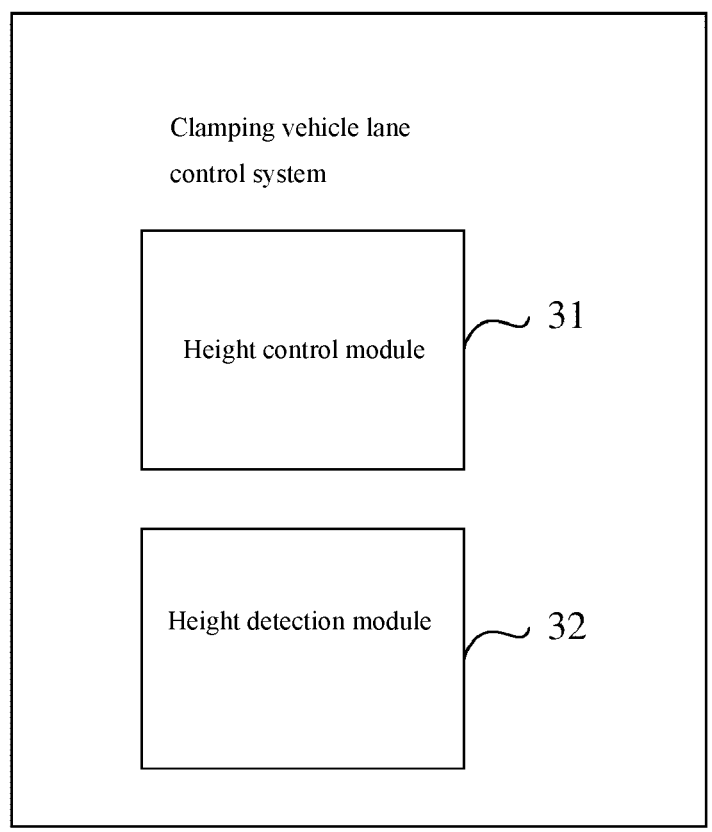
FIG. 7 is a schematic block diagram of a clamping vehicle lane control system according to preferred Embodiment 2 of the present disclosure.

The embodiment provides a clamping vehicle lane control system mainly used for controlling a height of a vehicle carrying plane 11 of a clamping vehicle lane 1. As shown in FIG. 7, the clamping vehicle lane control system comprises: a height control module 31.

The height control module 31 is used for controlling the vehicle carrying plane 11 to be raised and lowered between any two heights among an initial height h0, a battery removal height h1 and a battery installation height h2, the battery removal height h1 being a height that matches a battery pack removal process of an electric vehicle, and the battery installation height h2 being a height that matches a battery pack installation process of the electric vehicle.

In the step, the initial height h0 is a height of the vehicle carrying plane 11 which is immobile, and the vehicle carrying plane 11, when positioned at the initial height h0, can be positioned on the same plane as the battery swapping device walking plane 12; the battery removal height h1 is a height that matches the battery pack removal process of the electric vehicle; the battery installation height h2 is a height that matches the battery pack installation process of the electric vehicle. Both the battery removal height h1 and the battery installation height h2 are different from the initial height h0.

In this embodiment, the whole battery pack removal process may substantially include an entry stage of the battery swapping device before disassembling a battery, a battery disassembling stage, and an exit stage of the battery swapping device after disassembling the battery. The whole battery pack installation process may roughly include an entry stage of the battery swapping device before assembling a battery, a battery assembling stage, and an exit stage of the battery swapping device after assembling the battery. The battery removal height h1 can be matched with the entry stage of the battery swapping device before disassembling a battery, and is set to be higher than the initial height h0, and when the vehicle carrying plane 11 is positioned at the battery removal height h1, the relative height between the vehicle carrying plane 11 and the battery swapping device walking plane 12 is higher than the height of the battery swapping device 2 without loading a battery pack. The battery installation height h2 can be matched with the entry stage of the battery swapping device before assembling a battery, and is set to be higher than the initial height h0, and when the vehicle carrying plane 11 is positioned at the battery installation height h2, the relative height between the vehicle carrying plane 11 and the battery swapping device walking plane 12 is higher than the height of the battery swapping device 2 with a loaded battery pack.

Theoretically, the battery removal height h1 may be greater than, less than, or equal to the battery installation height h2. However, considering that for the battery swapping device 2, the battery pack is usually loaded on the top of the battery swapping device 2 and the height of the battery swapping device 2 with the loaded battery pack is higher than the height of the battery swapping device 2 without loading the battery pack, and in order to avoid that the vehicle carrying plane 11 is lifted too high during the battery pack removal process, so that too much lifting time is consumed, and the overall battery swapping efficiency is affected, the battery removal height h1 is preferably less than or equal to the battery installation height h2 in this embodiment. The specific values of the battery removal height h1 and the battery installation height h2 can be calculated by comprehensively considering factors such as the vehicle chassis height, the relative height between the initial height h0 and the battery swapping device walking plane 12, the height of the battery swapping device 2, and the height of the battery swapping device 2 with a loaded battery.

In this embodiment, controlling the vehicle carrying plane 11 to be raised and lowered between any two heights among an initial height h0, a battery removal height h1 and a battery installation height h2 may comprise controlling the vehicle carrying plane 11 to be raised and lowered from the initial height h0 to the battery removal height h1, from the initial height h0 to the battery installation height h2, from the battery removal height h1 to the battery installation height h2, from the battery removal height h1 to the initial height h0, from the battery installation height h2 to the initial height h0, or from the battery installation height h2 to the battery removal height h1. The way the vehicle carrying plane 11 is controlled to be raised and lowered as described above is specifically selected according to the actual need of disassembling and assembling the battery, for example:

the height control module 31 is specifically used for controlling the vehicle carrying plane 11 to be kept at the initial height h0 before the electric vehicle is parked at the vehicle carrying plane 11, referring to FIG. 2, wherein the vehicle carrying plane 11, when positioned at the initial height h0, can be positioned on the same plane as a plane where the clamping vehicle lane 1 is positioned, such that the vehicle is easy to enter the vehicle carrying plane 11.

The height control module 31 is specifically used for controlling the vehicle carrying plane 11 to reach the battery removal height h1 after the electric vehicle is parked at the vehicle carrying plane 11, referring to FIG. 3, wherein after the vehicle carrying plane 11 reaches the battery removal height h1, the battery swapping device 2 without loading the battery pack can move into the lower part of the bottom of the vehicle for disassembling the battery pack.

The height control module 31 is specifically used for controlling the vehicle carrying plane 11 to reach the battery installation height h2 after the battery pack is disassembled from the electric vehicle, referring to FIG. 4, wherein after the vehicle carrying plane 11 reaches the battery installation height h2, the battery swapping device 2 loaded with the disassembled battery pack can exit the lower part of the bottom of the vehicle, put the disassembled battery pack back to a battery rack or other positions, then load a new battery pack, and enter the lower part of the bottom of the vehicle again for assembling the battery pack.

The height control module 31 is specifically used for controlling the vehicle carrying plane 11 to return back to the initial height h0 after the battery pack is assembled on the electric vehicle, referring to FIG. 2, wherein the vehicle carrying plane 11, when positioned at the initial height h0, can be positioned on the same plane as a plane where the clamping vehicle lane 1 is positioned, such that the vehicle is easy to exit the vehicle carrying plane 11.

In this embodiment, the height control module 31 may be further used for controlling the vehicle carrying plane 11 to be raised and lowered between the first operation height h3 and any one of the initial height h0, the battery removal height h1 and the battery installation height h2, the first operation height h3 being another height that matches the battery pack removal process of the electric vehicle and different from the battery removal height h1.

The first operation height h3 can be matched with the battery disassembling stage described above, and set to be lower than the battery removal height h1, and may even be lower than the initial height h0, and when the vehicle carrying plane 11 is positioned at the first operation height h3, the relative height between the vehicle carrying plane 11 and the battery swapping device walking plane 12 meets the height condition of the battery swapping device 2 for disassembling the battery pack. The height condition of the battery swapping device 2 for disassembling the battery pack needs to be determined according to the operation process of the battery swapping device 2 in the battery disassembling stage, for example, when the battery pack is disassembled by the battery swapping device 2, a battery swapping platform on the battery swapping device needs to be lifted, such that a battery pack unlocking mechanism on the battery swapping platform unlocks the battery pack at the vehicle bottom, and then the disassembled battery pack is carried by the battery swapping platform. In order to match with the lifting height of the battery swapping platform and shorten the distance between the vehicle bottom and the battery swapping platform, the first operation height h3 can be properly adjusted to change the relative height between the battery swapping platform and the vehicle carrying plane 11, so as to ensure that the battery pack unlocking mechanism successfully unlocks and catches the disassembled battery pack.

In this embodiment, controlling the vehicle carrying plane 11 to be raised and lowered between the first operation height h3 and any one of the initial height h0, the battery removal height h1 and the battery installation height h2 may comprise controlling the vehicle carrying plane 11 to be raised and lowered from the initial height h0 to the first operation height h3, from the battery removal height h1 to the first operation height h3, from the battery installation height h2 to the first operation height h3, from the first operation height h3 to the initial height h0, from the first operation height h3 to the battery removal height h1, or from the first operation height h3 to the battery installation height h2. The way the vehicle carrying plane 11 is controlled to be raised and lowered as described above is specifically selected according to the actual need of disassembling the battery, for example:

The height control module 31 is specifically used for controlling the vehicle carrying plane 11 to reach the first operation height h3 in the battery pack removal process, referring to FIG. 5, wherein when the vehicle carrying plane 11 is positioned at the first operation height h3, the lifted battery swapping platform can enter the vehicle bottom, the battery pack at the vehicle bottom is unlocked, and then the disassembled battery pack is caught. In connection with the entry stage of the battery swapping device before disassembling a battery described above, this step is that the plane descends from the battery removal height h1 to the first operation height h3.

In this embodiment, the height control module 31 may be further used for controlling the vehicle carrying plane 11 to be raised and lowered between the second operation height h4 and any one of the initial height h0, the battery removal height h1 and the battery installation height h2, the second operation height h4 being another height that matches the battery pack installation process of the electric vehicle and different from the battery installation height h2.

The second operation height h4 can be matched with the battery assembling stage described above, and set to be lower than the battery installation height h2, and may even be lower than the initial height h0, and when the vehicle carrying plane 11 is positioned at the second operation height h4, the relative height between the vehicle carrying plane 11 and the battery swapping device walking plane 12 meets the height condition of the battery swapping device 2 for assembling the battery pack. The second operation height h4 may be the same as or different from the first operation height.

The height condition of the battery swapping device 2 for assembling the battery pack needs to be determined according to the operation process of the battery swapping device 2 in the battery assembling stage, for example, when the battery pack is assembled by the battery swapping device 2, a battery swapping platform on the battery swapping device needs to be lifted, such that the battery pack on the battery swapping platform is placed in a battery pack outer box, and then the battery pack is locked in the battery pack outer box by using a battery pack locking mechanism on the battery pack outer box. In order to match with the lifting height of the battery swapping platform and shorten the distance between the vehicle bottom and the battery swapping platform, the second operation height h4 can be properly adjusted to change the relative height between the battery swapping platform and the vehicle carrying plane 11, so as to ensure that the battery pack is successfully placed in the battery pack outer box and the battery pack is locked by the battery pack locking mechanism.

In this embodiment, controlling the vehicle carrying plane 11 to be raised and lowered between the second operation height h4 and any one of the initial height h0, the battery removal height h1 and the battery installation height h2 may comprise controlling the vehicle carrying plane 11 to be raised and lowered from the initial height h0 to the second operation height h4, from the battery removal height h1 to the second operation height h4, from the battery installation height h2 to the second operation height h4, from the second operation height h4 to the initial height h0, from the second operation height h4 to the battery removal height h1, or from the second operation height h4 to the battery installation height h2. The way the vehicle carrying plane 11 is controlled to be raised and lowered as described above is specifically selected according to the actual need of assembling the battery, for example:

The height control module 31 is specifically used for controlling the vehicle carrying plane 11 to reach the second operation height h4 in the battery pack installation process, referring to FIG. 6. In connection with the entry stage of the battery swapping device before assembling a battery described above, this step is that the plane descends from the battery installation height h2 to the second operation height h4.

In this embodiment, in order to accurately control the vehicle carrying plane 11 to reach the heights described above, height sensors are arranged on the vehicle carrying plane 11 and/or a plane where the clamping vehicle lane 1 is positioned, respectively, the height sensors being used for detecting a relative height between the vehicle carrying plane 11 and a reference plane. The clamping vehicle lane control system may further comprise a height detection module 32.

The height detection module 32 is used for detecting whether the vehicle carrying plane 11 reaches the initial height h0, the battery removal height h1, the battery installation height h2, the first operation height h3 or the second operation height h4 through the height sensors, and controlling a lifting mechanism used for controlling the height of the vehicle carrying plane 11 according to a detection result. For example, before the electric vehicle is parked at the vehicle carrying plane 11, whether the vehicle carrying plane 11 reaches the initial height h0 is determined; after the electric vehicle is parked at the vehicle carrying plane 11, whether the vehicle carrying plane 11 reaches the battery removal height h1 is determined; after the battery pack is disassembled from the electric vehicle, whether the vehicle carrying plane 11 reaches the battery installation height h2 is determined; in the battery pack removal process, whether the vehicle carrying plane 11 reaches the first operation height h3 is determined; and in the battery pack installation process, whether the vehicle carrying plane 11 reaches the second operation height h4 is determined. If the actual lifting height of the vehicle carrying plane 11 is not high enough and does not reach a corresponding height, then the lifting mechanism is controlled to continue lifting until the corresponding height is reached.

The clamping vehicle lane control system of the embodiment controls the height of the vehicle carrying plane 11, such that the vehicle carrying plane 11 can meet the battery swapping requirements of each stage, thereby shortening the overall battery swapping time, and improving the battery swapping efficiency.

Embodiment 3

Figure 8:
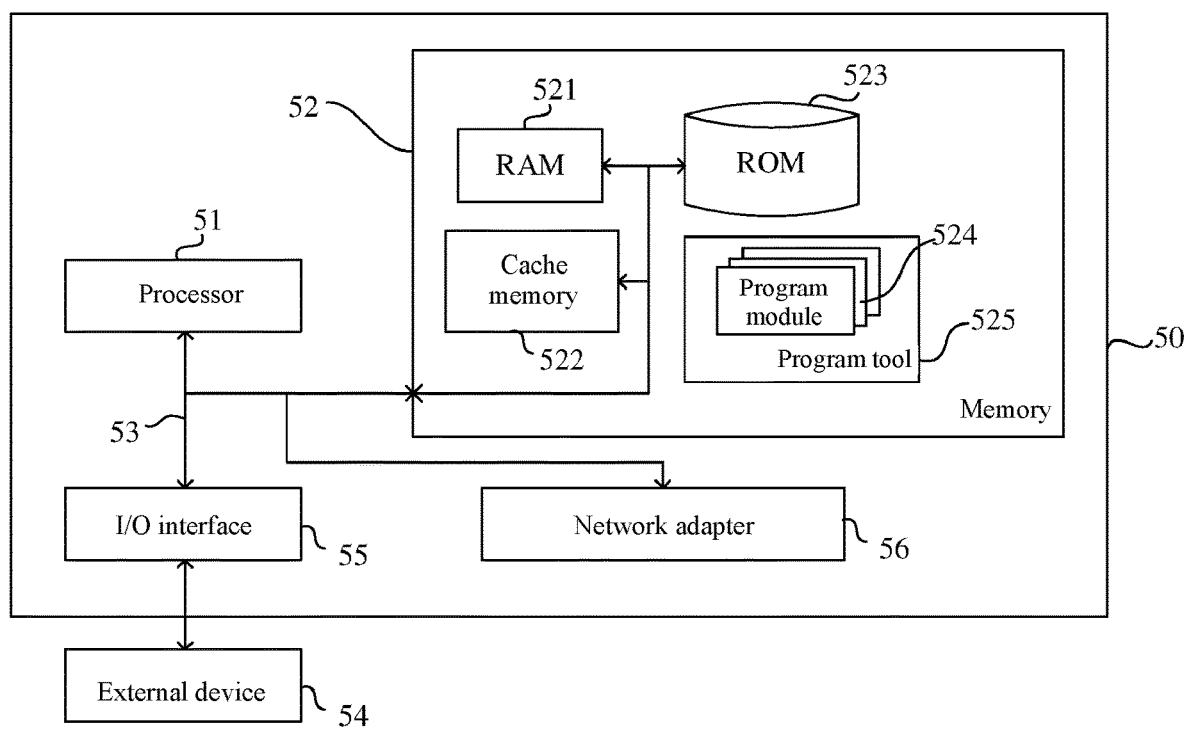
FIG. 8 is a schematic structural diagram of an electronic device according to preferred Embodiment 3 of the present disclosure.

FIG. 8 is a schematic structural diagram of an electronic device provided according to Embodiment 3 of the present disclosure. The electronic device comprises a memory, a processor and a computer program stored on the memory and executable on the processor, the processor, when executing the program, implementing the method according to Embodiment 1. The electronic device 50 shown in FIG. 8 is only an example, and should not bring any limitation to the functions and the use scope of the embodiment of the present disclosure.

As shown in FIG. 8, the electronic device 50 may be present in a form of a general purpose computing device, which may be, for example, a server device. The components of the electronic device 50 may include, but are not limited to: at least one processor 51, at least one memory 52, and a bus 53 connecting various system components (including the memory 52 and the processor 51).

The bus 53 includes a data bus, an address bus, and a control bus.

The memory 52 may include a volatile memory, such as a random access memory (RAM)521 and/or a cache memory 522, and may further include a read-only memory (ROM) 523.

The memory 52 may also include a program/utility 525 having a set (at least one) of program modules 525, such program modules 524 including, but not limited to: an operation system, one or more application programs, other program modules, and program data, each of which or some combinations thereof may include an implementation of a network environment.

The processor 51 executes various functional applications and performs data processing, such as the method provided in Embodiment 1 of the present disclosure, by executing the computer program stored in the memory 52.

The electronic device 50 may also communicate with one or more external devices 54 (e.g., a keyboard and a pointing device). Such communication may be implemented through an input/output (I/O) interface 55. In addition, the model-generating device 50 may also communicate with one or more networks (e.g., a local area network (LAN), a wide area network (WAN), and/or a public network, such as the Internet) via a network adapter 56. The network adapter 56 communicates with other modules of the model-generating device 50 via the bus 53. It should be understood that although not shown in the figures, other hardware and/or software modules may be used in conjunction with the model-generating device 50, including, but not limited to: microcode, device drivers, redundant processors, external disk drive arrays, RAID (disk array) systems, tape drives, data backup storage systems, and the like.

It should be noted that although several units/modules or sub-units/modules of the electronic device are mentioned in the above detailed description, such a division is merely exemplary but not mandatory. Indeed, the features and functions of two or more of the units/modules described above may be embodied in one unit/module according to embodiments of the present disclosure. Conversely, the features and functions of one unit/module described above may be further divided into embodiments by a plurality of units/modules.

Embodiment 4

This embodiment provides a computer-readable storage medium having a computer program stored thereon, the program, when executed by a processor, implementing the steps of the method provided in Embodiment 1.

More specific examples that may be employed by the readable storage medium include, but are not limited to: a portable disk, a hard disk, a random access memory, a read-only memory, an erasable programmable read-only memory, an optical storage device, a magnetic storage device, or any suitable combination of the foregoing.

In a possible implementation, the present disclosure can also be implemented in a form of a program product comprising program codes used for causing a terminal device to implement the steps of the method for the implementation of Embodiment 1 when the program product is executed on the terminal device.

The program codes used for implementing the present disclosure are written in any combination of one or more programming languages, wherein the program codes may be executed entirely on a user device, partly on the user device, as a stand-alone software package, partly on the user device and partly on a remote device, or entirely on the remote device.

Although specific embodiments of the present disclosure have been described above, it should be understood by those skilled in the art that these embodiments are merely illustrative and that the protection scope of the present disclosure is defined by the appended claims. Various changes or modifications can be made to these embodiments by those skilled in the art without departing from the principle and spirit of the present disclosure, and such changes and modifications shall fall within the protection scope of the present disclosure.

What is claimed is:

1. A clamping vehicle lane control method, wherein a clamping vehicle lane has a vehicle carrying plane used for carrying an electric vehicle and capable of raising and lowering;

the clamping vehicle lane control method comprises:
controlling the vehicle carrying plane to be raised and lowered between any two heights among an initial height, a battery removal height and a battery installation height, wherein the battery removal height is a height that matches a battery pack removal process of the electric vehicle, and the battery installation height is a height that matches a battery pack installation process of the electric vehicle;

the clamping vehicle lane control method further comprising:

controlling the vehicle carrying plane to be raised and lowered between a first operation height and any one of the initial height, the battery removal height and the battery installation height, the first operation height being another height that matches the battery pack removal process of the electric vehicle and different from the battery removal height.

2. The clamping vehicle lane control method according to claim 1, wherein a battery swapping device walking plane for walking of a battery swapping device used for disassembling and assembling a battery pack is arranged on the clamping vehicle lane; the battery removal height is set to be: higher than the initial height, and when the vehicle carrying plane is positioned at the battery removal height, a relative height between the vehicle carrying plane and the battery swapping device walking plane is higher than a height of the battery swapping device without loading a battery pack;

and/or, a battery swapping device walking plane for walking of a battery swapping device used for disassembling and assembling a battery pack is arranged on the clamping vehicle lane; the battery installation height is set to be: higher than the initial height, and when the vehicle carrying plane is positioned at the battery installation height, a relative height between the vehicle carrying plane and the battery swapping device walking plane is higher than a height of the battery swapping device with a loaded battery pack.

3. The clamping vehicle lane control method according to claim 1, wherein the battery removal height is less than or equal to the battery installation height.

4. The clamping vehicle lane control method according to claim 1, wherein controlling the vehicle carrying plane to be raised and lowered between any two heights among an initial height, a battery removal height and a battery installation height comprises:

controlling the vehicle carrying plane to be kept at the initial height before the electric vehicle is parked at the vehicle carrying plane;

and/or, controlling the vehicle carrying plane to reach the battery removal height after the electric vehicle is parked at the vehicle carrying plane;

and/or, controlling the vehicle carrying plane to reach the battery installation height after the battery pack is disassembled from the electric vehicle;

and/or, controlling the vehicle carrying plane to return back to the initial height after the battery pack is assembled on the electric vehicle.

5. The clamping vehicle lane control method according to claim 1, wherein the battery swapping device walking plane for walking of the battery swapping device used for disassembling and assembling the battery pack is arranged on the clamping vehicle lane; the first operation height is set to be: lower than the battery removal height, and when the vehicle carrying plane is positioned at the first operation height, the relative height between the vehicle carrying plane and the battery swapping device walking plane meets a height condition of the battery swapping device for disassembling the battery pack.

6. The clamping vehicle lane control method according to claim 1, further comprising:

controlling the vehicle carrying plane to be raised and lowered between a second operation height and any one of the initial height, the battery removal height and the battery installation height, the second operation height being another height that matches the battery pack installation process of the electric vehicle and different from the battery installation height.

7. The clamping vehicle lane control method according to claim 6, wherein the battery swapping device walking plane for walking of the battery swapping device used for disassembling and assembling the battery pack is arranged on the clamping vehicle lane; the second operation height is set to be: lower than the battery installation height, and when the vehicle carrying plane is positioned at the second operation height, the relative height between the vehicle carrying plane and the battery swapping device walking plane meets a height condition of the battery swapping device for assembling the battery pack.

8. The clamping vehicle lane control method according to claim 6, wherein controlling the vehicle carrying plane to be raised and lowered between a second operation height and any one of the initial height, the battery removal height and the battery installation height comprises:

controlling the vehicle carrying plane to reach the second operation height in the battery pack installation process.

9. The clamping vehicle lane control method according to claim 1, wherein controlling the vehicle carrying plane to be raised and lowered between a first operation height and any one of the initial height, the battery removal height and the battery installation height comprises:

controlling the vehicle carrying plane to reach the first operation height in the battery pack removal process.

10. The clamping vehicle lane control method according to claim 1, wherein height sensors are arranged on the vehicle carrying plane and/or a plane where the clamping vehicle lane is positioned, respectively, the height sensors being used for detecting a relative height between the vehicle carrying plane and a reference plane; the clamping vehicle lane control method further comprises:

detecting whether the vehicle carrying plane reaches the initial height, the battery removal height, the battery installation height, the first operation height or the second operation height through the height sensors, and controlling a lifting mechanism used for controlling a height of the vehicle carrying plane according to a detection result.

11. The clamping vehicle lane control method according to claim 1, wherein the battery swapping device walking plane for walking of the battery swapping device used for disassembling and assembling the battery pack is arranged on the clamping vehicle lane, and the vehicle carrying plane, when positioned at the initial height, is positioned on the same plane as the battery swapping device walking plane.

12. An electronic device, comprising a memory, a processor and a computer program stored on the memory and executable on the processor, the processor, when executing the program, implementing the method according to claim 1.

13. A computer-readable storage medium having a computer program stored thereon, the program, when executed by a processor, implementing the steps of the method according to claim 1.

14. A clamping vehicle lane control system, wherein a clamping vehicle lane has a vehicle carrying plane used for carrying an electric vehicle and capable of raising and lowering;

the clamping vehicle lane control system comprises:
a height control module, used for controlling the vehicle carrying plane to be raised and lowered between any two heights among an initial height, a battery removal height and a battery installation height, the battery removal height being a height that matches a battery pack removal process of the electric vehicle, and the battery installation height being a height that matches a battery pack installation process of the electric vehicle;
wherein the height control module is further used for controlling the vehicle carrying plane to be raised and lowered between a first operation height and any one of the initial height, the battery removal height and the battery installation height, the first operation height being another height that matches the battery pack removal process of the electric vehicle and different from the battery removal height.

15. The clamping vehicle lane control system according to claim 14, wherein a battery swapping device walking plane for walking of a battery swapping device used for disassembling and assembling a battery pack is arranged on the clamping vehicle lane; the battery removal height is set to be: higher than the initial height, and when the vehicle carrying plane is positioned at the battery removal height, a relative height between the vehicle carrying plane and the battery swapping device walking plane is higher than a height of the battery swapping device without loading a battery pack;

and/or, a battery swapping device walking plane for walking of a battery swapping device used for disassembling and assembling a battery pack is arranged on the clamping vehicle lane; the battery installation height is set to be: higher than the initial height, and when the vehicle carrying plane is positioned at the battery installation height, a relative height between the vehicle carrying plane and the battery swapping device walking plane is higher than a height of the battery swapping device with a loaded battery pack;

and/or, the battery removal height is less than or equal to the battery installation height;

and/or, the height control module is specifically used for controlling the vehicle carrying plane to be kept at the initial height before the electric vehicle is parked at the vehicle carrying plane;

and/or, the height control module is specifically used for controlling the vehicle carrying plane to reach the battery removal height after the electric vehicle is parked at the vehicle carrying plane;

and/or, the height control module is specifically used for controlling the vehicle carrying plane to reach the battery installation height after the battery pack is disassembled from the electric vehicle;

and/or, the height control module is specifically used for controlling the vehicle carrying plane to return back to the initial height after the battery pack is assembled on the electric vehicle;

and/or, height sensors are arranged on the vehicle carrying plane and/or a plane where the clamping vehicle lane is positioned, respectively, the height sensors being used for detecting a relative height between the vehicle carrying plane and a reference plane; the clamping vehicle lane control system further comprises: a height detection module, used for detecting whether the vehicle carrying plane reaches the initial height, the battery removal height, the battery installation height, a first operation height or a second operation height through the height sensors, and controlling a lifting mechanism used for controlling the height of the vehicle carrying plane according to a detection result;

and/or, a battery swapping device walking plane for walking of a battery swapping device used for disassembling and assembling a battery pack is arranged on the clamping vehicle lane, and the vehicle carrying plane, when positioned at the initial height, is positioned on the same plane as the battery swapping device walking plane.

16. The clamping vehicle lane control system according to claim 14, wherein a battery swapping device walking plane for walking of a battery swapping device used for disassembling and assembling a battery pack is arranged on the clamping vehicle lane;

the first operation height is set to be: lower than the battery removal height, and when the vehicle carrying plane is positioned at the first operation height, a relative height between the vehicle carrying plane and the battery swapping device walking plane meets a height condition of the battery swapping device for disassembling the battery pack;

and/or, the height control module is specifically used for controlling the vehicle carrying plane to reach the first operation height in the battery pack removal process.

17. The clamping vehicle lane control system according to claim 14, wherein the height control module is further used for controlling the vehicle carrying plane to be raised and lowered between a second operation height and any one of the initial height, the battery removal height and the battery installation height, the second operation height being another height that matches the battery pack removal process of the electric vehicle and different from the battery removal height.

18. The clamping vehicle lane control system according to claim 17, wherein a battery swapping device walking plane for walking of a battery swapping device used for disassembling and assembling a battery pack is arranged on the clamping vehicle lane; the second operation height is set to be: lower than the battery installation height, and when the vehicle carrying plane is positioned at the second operation height, a relative height between the vehicle carrying plane and the battery swapping device walking plane meets a height condition of the battery swapping device for assembling the battery pack;

and/or, the height control module is specifically used for controlling the vehicle carrying plane to reach the second operation height in the battery pack installation process.

* * * * *